United States Patent Office 3,045,005
Patented July 17, 1962

3,045,005
MONOAZO DYESTUFFS
Jean-Pierre Jung, Riehen, near Basel, and Guido Schetty, Basel, Switzerland, assignors to J. R. Geigy A.-G., Basel, Switzerland
No Drawing. Filed Nov. 23, 1959, Ser. No. 854,548
Claims priority, application Switzerland Jan. 6, 1958
7 Claims. (Cl. 260—198)

The present invention concerns new monoazo dyestuffs which draw well from even a neutral to weakly acid bath onto wool and produce very pure dyeings which have very good fastness to wet and light. The invention is also concerned with a process for the production of these new dyestuffs and with the use thereof for the dyeing of natural and synthetic polypeptide fibres, and finally, it is concerned with the material fast dyed with the new dyestuffs.

It has been found that valuable monoazo dyestuffs are obtained if a diazotised 2-aminobenzene-1-sulphonyl compound having the sulphonyl substituent —$SO_2R$ wherein R represents an aryl, aryloxy or an organic amine radical, which 2-aminobenzene-1-sulphonyl compound can be further substituted non-ionogenically in the benzene ring, is coupled in an acid medium with a 2-aminonaphthalene sulphonic acid amide coupling in the 1-position and containing, possibly, a hydroxyl group in the 8-position. In this reaction the components are so chosen that either in the diazo component the radical R contains a sulphonic acid group or in the coupling component the sulphamide nitrogen atom is substituted by a sulphonated organic radical.

The radical R in the diazo component is either a radical of the benzene series or then a secondary amino radical. The substituents of this amine radical can be aliphatic, cycloaliphatic, araliphatic or aromatic. The radical R can also be an aryloxy group. Examples of substituents which can be present both in the benzene ring containing amino groups and in the radical R are those usual in azo dyestuffs, vis: halogens, nitro, alkyl, alkoxy, aryloxy, alkyl carbonyl, aryl carbonyl and acylated amino groups. Of the diazo components substituted at the aminobenzene ring, those are preferred which contain nucleophilic substituents such as low alkyl groups, ether or acylamino groups.

For example, the following amines produce o-diazobenzene aryl sulphones used according to the present invention:
2-amino-1.1'-diphenyl sulphone,
4'-methyl-2-amino-1.1'diphenyl sulphone,
4'-chloro-2-amino-1.1'-diphenyl sulphone,
4.4'dichloro-2-amino-1.1'-diphenyl sulphone,
4- or 5- or 3'-acetylamino-2-amino-1.1'- diphenyl sulphone
as well as the corresponding 4- or 5- or 3'-propionyl-amino and benzoylamino derivatives and 4- or 5- or 3'-carbomethoxyamino-, carboamyloxyamino-, carbocyclohexyloxyamino-, carbobenzyloxyamino- or carbophenoxyamino- 2-amino-1.1'-diphenyl sulphone.

Examples of 2-aminobenzene-1-aryl sulphones which contain the sulphonic acid group in the aryl sulphonyl radical are:
2-amino-1.1'-diphenyl sulphone-3'-sulphonic acid,
2-amino-3'-sulphoacetylamino-1.1'-diphenyl sulphone,
2-amino-4- or -5-carbethoxyamino-4'-methyl-1.1'-diphenyl sulphone-3'-sulphonic acid,
2-amino-4- or 5-carbobutoxyamino-4'-methyl-1.1'-diphenyl sulphone-3'- sulphonic acid and
2-amino-4- or -5-carbobenzyloxy- or -carbocyclohexyloxy- amino-4'-methyl-1.1'-diphenyl sulphone-3'-sulphonic acid.

In the o-diazobenzene sulphonic acid aryl esters used according to the present invention, the radical R linked to the sulphonyl group represents an aryloxy group of the benzene or naphthalene series which can be further substituted as is usual in azo dyestuffs. Examples of the amines of which the diazonium compounds are used are as follows:
2-aminobenzene sulphonic acid phenylester,
2-aminobenzene sulphonic acid-2'- or -4'-methylphenyl ester,
2-aminobenzene sulphonic acid-4'-amylphenyl ester,
2-aminobenzene sulphonic acid-3'.4'-dichlorophenyl ester,
2-aminobenzene sulphonic acid-2'- or -4'-cyclohexylphenyl ester,
2-aminobenzene sulphonic acid-2'- or -4'-xenyl ester,
2-aminobenzene sulphonic acid-2'- or -4'-phenoxyphenyl ester,
2-aminobenzene sulphonic acid-4'-acetyl, -propionyl, -butyryl- or -chloracetyl- aminophenyl ester,
2-aminobenzene sulphonic acid-4'-carbomethoxyamino-, carbobenzyloxyamino- or -carbocyclohexyloxyamino-phenyl ester,
2-aminobenzene sulphonic acid-α- or -β-naphthyl ester and 2-aminobenzene sulphonic acid-β-(ar)-tetrahydronaphthyl ester.

If R is a sulphonated aryloxy group, then this is derived from a monohydroxy compound of the benzene or naphthalene series. The sulphonic acid group can be bound direct to an aromatic ring or it can be bound to such a ring by way of a non-aromatic bridging member. The aryloxy radical may possibly be further substituted as given above. Examples of 2-aminobenzene-1-sulphonic acid aryl esters used according to the present invention are
2-aminobenzene-1-sulphonic acid-4'-sulphophenyl ester,
2-aminobenzene-1-sulphonic acid-4'-sulphoacetylamino-phenyl ester,
2-aminobenzene-1-sulphonic acid-(2'methyl-4'-sulphoacetylamino)-phenyl ester,
2-aminobenzene-1-sulphonic acid-(2'-chloro-4'-sulphoacetylamino)-phenyl ester,
4-chloro-2-aminobenzene-1-sulphonic acid-4'-sulphoacetylaminophenyl ester,
2-aminobenzene-1-sulphonic acid-4'-(4''-sulphophenoxy)-phenyl ester and
2-aminobenzene-1-sulphonic acid-4''-sulphodiphenyl-(4')-ester.

Finally, R can be an organic amine radical. In the o-diazobenzene sulphonic acid amides used according to the present invention, the hydrogen atoms of the amide group are substituted by aliphatic, cycloaliphatic, araliphatic or aromatic radicals. Examples of such diazo components are:
2-aminobenzene sulphonic acid-N-dimethylamide,
2-aminobenzene sulphonic acid-N-diethylamide,
2-aminobenzene sulphonic acid-N-dibutylamide,
2-aminobenzene sulphonic acid-N-ethyl-N-phenylamide,
2-aminobenzene sulphonic acid-N-methyl-N.4'-chlorophenylamide,
2-aminobenzene sulphonic acid-N-methyl-N-3'.4'-dichlorophenylamide,
2-aminobenzene sulphonic acid-N-ethyl-N.2'-methylphenylamide,
2-aminobenzene sulphonic acid-N-methyl-N-4'-amyl- or -4'-butylphenylamide,
2-aminobenzene sulphonic acid-N-methyl-N-β-hydroxyethylamide,
2-aminobenzene sulphonic acid-N-methyl-N-γ-methoxypropylamide, 5-amyl-2-aminobenzenesulphonic acid-N-methyl-N-phenylamide,
2-aminobenzene sulphonic acid-N-methyl-N-cyclohexylamide,
2-aminobenzene sulphonic acid-N-dicyclohexylamide,
2-aminobenzene sulphonic acid-N-methyl-N-xenylamide,
2-aminobenzene sulphonic acid-N-methyl-N-4'-phenoxyphenylamide,
2-aminobenzene sulphonic acid-N-methyl-N-α-naphthylamide,
2-aminobenzene sulphonic acid-N-methyl-N-β-naphthylamide,
2-aminobenzene sulphonic acid-N-methyl-N-benzylamide and
2-aminobenzene sulphonic acid-N-benzyl-N-phenylamide.

The diazonium compounds of the following amines are given as examples of o-diazobenzene sulphonic acid amides containing a sulphonic acid group used according to the present invention: 2-aminobenzene-1-sulphonic acid-N-methyl-N-β-sulphoethylamide, 2-aminobenzene-1-sulphonic acid-N-ethyl-N-4'-sulphophenylamide, 2-aminobenzene-1-sulphonic acid - N - benzyl-N-4'-sulphophenylamide, 2-aminobenzene-1-sulphonic acid-N-cyclohexyl-N-4'-sulphophenylamide, 2-aminobenzene - 1 - sulphonic acid - N - methyl-N-3'- or -4'-sulphoacetylaminophenylamide, 4-chloro-2-aminobenzene - 1 - sulphonic acid-N-methyl - N -3'- or -4' - sulphoacetylaminophenylamide, 2-aminobenzene-1-sulphonic acid-N-methyl-N-4'-(4''-sulphophenoxy)-phenylamide, 2 - aminobenzene-1-sulphonic acid-N-methyl - N - 2' - (2'' - sulphophenoxy)-5'-chlorophenylamide, 2-aminobenzene-1-sulphonic acid-N-methyl-N-4''-sulphodiphenyl-(4')-amide and 2-aminobenzene-1-sulphonic acid-N-methyl-N-[5'- or -6'- or -7'-sulphonaphthyl-(2')] amide.

The diazo components used according to the present invention are obtained by known methods. Sulphonic acid amides and esters are produced from o-nitrobenzene sulphonic acid halides by condensation with amines or phenols and then the nitro group is reduced to the amino group. Aryl sulphones are obtained by condensing aryl sulphinic acids with nitrobenzenes containing mobile halogen and then reducing the nitro group to the amino group.

The coupling components used according to the present invention are substituted 2-aminonaphthalene sulphonic acid amides which couple in the 1-position. Chiefly derivatives of 2-amino naphthalene-5-, -6- and -7-sulphonic acids are used. The coupling components are characterized in that they can be substituted at the sulphamide nitrogen atom by a sulphonated organic radical whilst the naphthalene ring itself has no free sulphonic acid group. This ring however, can contain a hydroxyl group in the 8-position.

The sulphamide groups can be derived from primary or secondary aliphatic, cycloaliphatic, araliphatic or aromatic amines. The following are examples of substituted sulphonic acid amide groups: sulphonic acid methyl, ethyl, propyl, butyl, tert. amyl and octyl amide groups, sulphonic acid-β-hydroxyethyl and γ-methoxypropyl amide groups, sulphonic acid dimethyl, diethyl, dibutyl and di-2-(ethylhexyl)-amide groups, sulphonic acid-N-methyl-N-β-hydroxyethyl amide group, sulphonic acid benzyl, -4-chlorobenzyl, -3.4-dichlorobenzyl and -dibenzyl amide groups, sulphonic acid cyclohexyl, methylcyclohexyl and dicyclohexyl amide groups, sulphonic acid-N-methyl or sulphonic acid-N-ethyl or sulphonic acid-N-propyl cyclohexyl amide groups, sulphonic acid-N-methyl or sulphonic acid-N-ethyl or sulphonic acid-N-propyl benzyl or phenyl amide groups, sulphonic acid-N-methyl or sulphonic acid-N-ethyl-2-methylphenyl or -4-methoxyphenyl or -4-chlorophenyl amide groups, sulphonic acid-N-methyl- or -N-ethyl- or -N-cyclohexyl-4-(methylsulphonylamino)-phenylamide groups, sulphonic acid-α- or -β-naphthyl and α- or β-tetrahydronaphthyl amide groups as well as the corresponding N-methylated amide groups and sulphonic acid morpholide group.

The sulphonated organic radical of the sulphamide group can be of the araliphatic or aromatic series, in the latter case it is advantageous if it does not contain more than two benzene nuclei. It is desirable, with a view to the alkali fastness of the dyestuffs, that both hydrogen atoms of the sulphamide group are substituted and it is advantageous if, apart from the sulphonated organic radical, an unsulphonated, aliphatic or araliphatic radical is present. In this regard, low alkyl groups are preferred. Examples of coupling components substituted at the sulphamide nitrogen atom by a sulphonated organic radical used according to the present invention are the 2-aminonaphthalene and 2-amino-8-hydroxynaphthalene compounds which contain in the 5-, 6- or 7-position an N-(4-sulphobenzyl)-sulphonic acid amide group, an N-(4-chloro-2-sulphobenzyl)-sulphonic acid amide group, an N-(4-sulphobenzyl)-N-methyl sulphonic acid amide group, an N-(4-sulphobenzyl)-N-benzyl sulphonic acid amide group, an N-(4-sulphophenyl)-N-methyl sulphonic acid amide group, an N-(3-sulphophenyl)-N-methyl sulphonic acid amide group, an N-(4-sulphophenyl)-N-ethyl- or -N-butyl sulphonic acid amide group, an N-(4-sulphobenzyl)-N-phenyl sulphonic acid amide group, an N-(4-sulphophenyl)-N-benzyl sulphonic acid amide group, and N-[7-sulphonaphthyl-(2)]-sulphonic acid amide group, an N-[7-sulphonaphthyl-(2)]-N-methyl sulphonic acid amide group or an N-[4-sulphonaphthyl-(1)]-N-methyl sulphonic acid amide group.

The coupling components used according to the present invention are new and can be produced for example in the following manner: 2-aminonaphthalene sulphonic acids, after acylating the amino group and any hydroxyl group present, are converted with phosphorus halides into the corresponding sulphonic acid halides. These are condensed with sulphonated primary or secondary amines to form the corresponding acylaminonaphthalene sulphonic acid amides in which the acylamino substituents and any acyloxy substituents present of the naphthalene ring are saponified.

Of the coupling components, chiefly 2-aminonaphthalene-7-sulphonic acid amides are valuable for the production of orange dyestuffs and 2-amino-8-hydroxynaphthalene-6-sulphonic acid amides for the production of red dyestuffs according to the present invention. Because of the good wet fastness properties of the dyestuffs obtained therewith, those coupling components are preferred which contain at the sulphamide nitrogen atom an alkyl radical, chiefly a low alkyl radical, and a sulphonated aryl radical, chiefly a sulphonated phenyl or naphthyl radical. Thus the most valuable dyestuffs according to the present invention are derived from diazo components which are either not substituted in the benzene nucleus or are further substituted only by nucleophilic, non-ionogenic groups and wherein R is an aryloxy group and from 2-aminonaphthalene-7-sulphonic acid amides as well as 2-amino-8-hydroxynaphthalene-6-sulphonic acid amides having a tertiary amide nitrogen atom containing a sulphonated organic radical.

The o-aminobenzene sulphonyl compounds used according to the present invention are diazotised and coupled by the usual methods. On coupling, often the presence of water soluble organic solubility promoters such as, e.g. ethyl alcohol or dioxan, is of advantage.

The azo dyestuffs produced according to the present invention are generally isolated in the form of their alkali metal salts for example as the lithium, potassium or sodium salts. As such they are orange, red to violet powders which are easily soluble in hot water. From even neutral baths containing ammonium sulphate, which are completely exhausted, they dye natural and synthetic polypeptide fibres, in particular wool, in excellently level, wet fast, very pure orange, yellowish red to blueish red shades. They can also be dyed with equal success however, from an acid, for example acetic acid, bath. The wool dyeings obtained from both a neutral and an acid bath are distinguished by very good fastness to light, very good wet fastness properties, in particular fastness to milling and also to washing and sea water.

The new monoazo dyes of the present invention correspond to the general formula

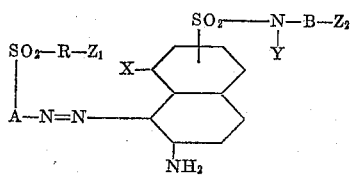

In this formula

A represents a mononuclear carbocyclic aryl radical containing the sulphonyl group in o-position to the azo group and which is free from carboxylic acid and sulphonic acid groups,
B represents a member selected from the group consisting of phenyl, benzyl, and naphthyl radicals free from carboxylic acid groups, and if $Z_2$ is hydrogen, also alkyl and cyclohexyl radicals,
R represents a member selected from the group consisting of monocyclic aryl, at most bicyclic aryloxy and secondary amino radicals, free from carboxylic acid groups,
X represents a member selected from the group consisting of H and OH, and
Y represents a member selected from the group consisting of hydrogen, lower alkyl and benzyl radicals, and if $Z_2$ is hydrogen, also cyclohexyl radicals,
and of $Z_1$ and $Z_2$, one Z represents the sulphonic acid group and the other Z represents hydrogen.

A particularly valuable class of dyestuffs according to the present invention corresponds to the formula

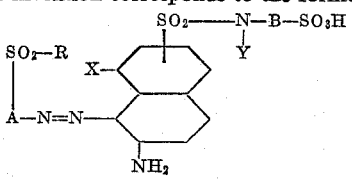

wherein
A represents a mononuclear carbocyclic aryl radical containing the sulphonyl group in o-position to the azo group and which is free from carboxylic acid and sulphonic acid groups,
B represents a member selected from the group consisting of phenyl, benzyl and naphthyl radicals free from carboxylic acid groups,
R represents a member selected from the group consisting of monocyclic aryl, at most bicyclic aryloxy and secondary amino radicals, free from carboxylic acid and sulphonic acid groups,
X represents a member selected from the group consisting of H and OH, and
Y represents a member selected from the group consisting of hydrogen, lower alkyl and benzyl radicals.

Of these dyestuffs, those in which the coupling component is a 2-amino-8-hydroxynaphthalene-6-sulphonic acid amide containing an alkyl radical and a sulphophenyl radical at the sulphamide nitrogen atom, are distinguished in particular by their very good fastness to light. Of these, those are again the most valuable in which R is at most a bicyclic aryloxy radical.

A further class of dyestuffs according to the invention corresponds to the formula

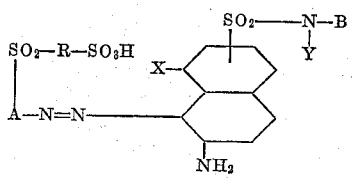

wherein
A represents a mononuclear carbocyclic aryl radical containing the sulphonyl group in o-position to the azo group and which is free from carboxylic acid and sulphonic acid groups,
B represents a member selected from the group consisting of alkyl, cyclohexyl, phenyl, benzyl and naphthyl radicals free from carboxylic acid and sulphonic acid groups,
R represents a member selected from the group consisting of monocyclic aryl, at most bicyclic aryloxy and secondary amino radicals, free from carboxylic acid groups,
X represents a member selected from the group consisting of H and OH, and
Y represents a member selected from the group consisting of hydrogen, lower alkyl, cyclohexyl and benzyl radicals.

The following examples illustrate the invention without limiting it in any way. In the examples parts are given as parts by weight and the temperatures are in degrees centigrade.

EXAMPLE 1

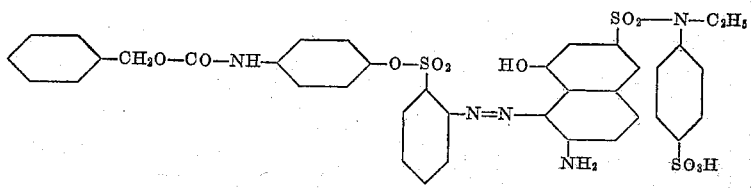

39.8 parts of 2-aminobenzene-1-sulphonic acid-4'-carbobenzyloxyamino phenyl ester are suspended in 180 parts of glacial acetic acid, dissolved by the dropwise addition of 25 parts of 30% hydrochloric acid and diazotised at 5–10° by the quick addition of 6.9 parts of sodium nitrite in 20 parts of water. The yellowish diazo solution is poured at 2–5° into an acetic acid suspension of 42.2 parts of 2-amino-8-hydroxynaphthalene-6-sulphonic acid-N-ethyl-N-4'-sulphophenyl amide and 25 parts of crystallised sodium acetate in 500 parts of water and 500 parts of ethanol. Coupling occurs immediately and the colour becomes red. After 8 hours' stirring at 5–10°, the reaction mixture is heated to 80°, the acid is partially neutralised by sprinkling in 80 parts of sodium carbonate, the precipitated dyestuff is filtered off under suction, washed well with 2% sodium chloride solution and dried.

The monoazo dyestuff dyes wool in the presence of ammonium sulphate at a neutral to weakly acid reaction in pure, very level blueish red shades. The dyeings are fast to wet and light and the bath is well exhausted.

EXAMPLE 2

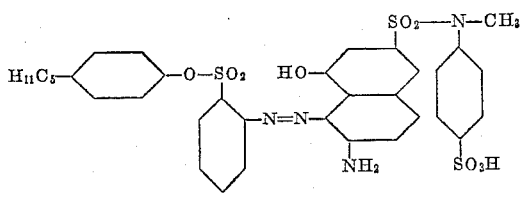

31.9 parts of 2-aminobenzene-1-sulphonic acid-4'-amylphenyl ester in 180 parts of glacial acetic acid and 25 parts of concentrated hydrochloric acid are diazotised at 5–10° with 6.9 parts of sodium nitrite. The diazo solution, diluted with ice water, is gradually added dropwise while stirring at 2–5° to the acetic acid suspension of 40.8 parts of 2-amino-8-hydroxynaphthalene-6-sulphonic acid-N-methyl-N-4'-sulphophenylamide in 400 parts of ethanol and 300 parts of water. The monoazo dyestuff which forms, precipitates in the form of a red powder. Stirring is continued for several hours at 5–10°, the mixture is heated to 60°, the acid is partially neutralised by sprinkling in 50 parts of sodium carbonate and the red precipitate is filtered off under suction and dried. In the form of the sodium salt, the dyestuff is a brown-red powder which dissolves in hot water with a blueish-red shade. On boiling in a liquor containing 5% ammonium sulphate, it dyes wool in pure, blueish red shades which are fast to light, milling and washing.

EXAMPLE 3

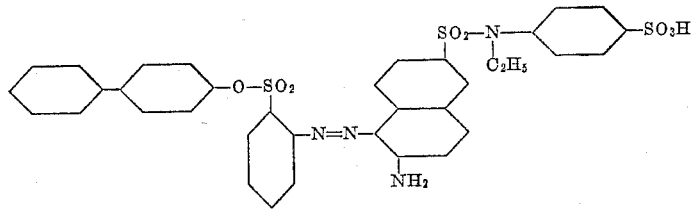

32.5 parts of 2-aminobenzene-1-sulphonic acid-4'-xenyl ester in 200 parts of glacial acetic acid are dissolved in 20 parts of concentrated sulphuric acid and diazotised at 5–10° by the dropwise addition of 6.9 parts of sodium nitrite in 15 parts of water. The diazo solution, diluted with ice water, is poured at 0–5° into an acetic acid suspension of 40.6 parts of 2-aminonaphthalene-6-sulphonic acid-N-ethyl-N.β-sulphophenylamide in 500 parts of water. The whole is stirred for several hours at 0–5°, heated to 60° and 120 parts of sodium chloride are added. The precipitated dyestuff is filtered off and dried. It dyes wool from a neutral to weakly acid bath in the presence of ammonium sulphate in orange shades which are fast to wet and light.

EXAMPLE 4

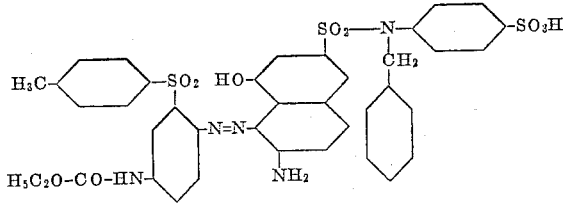

33.4 parts of 5-carbethoxyamino-2-amino-4'-methyl-1.1'-diphenyl sulphone in 150 parts of glacial acetic acid are dissolved with 40 parts of concentrated hydrochloric acid and diazotised at 5–10° by the dropwise addition of 6.9 parts of sodium nitrite in 20 parts of water. The yellow diazo solution is stirred for another hour at 0–5° and the excess nitrous acid is decomposed. The diazo solution is poured at 2–5° into an acetic acid suspension of 48.4 parts of 2-amino-8-hydroxynaphthalene-6-sulphonic acid-N-benzyl-N-4'-sulphophenyl amide in 500 parts of ethanol and 300 parts of water. The whole is stirred for several hours at 0–5°, heated to 60° and 100 parts of sodium chloride are added. The precipitated dyestuff is filtered off and dried. The dyestuff dyes wool from a neutral to weakly acid bath in the presence of ammonium sulphate in pure blueish red shades which are fast to light and alkali.

EXAMPLE 5

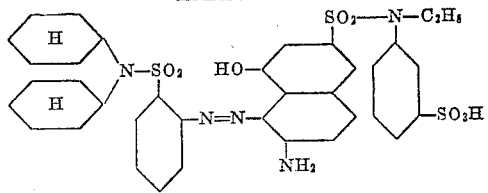

33.6 part of 2-aminobenzene-1-sulphonic acid dicyclohexylamide in 150 parts of glacial acetic acid are dissolved cold with 19 parts of concentrated sulphuric acid and diazotised at 10–15° while stirring well with a solution of 6.9 parts of sodium nitrite in 15 parts of water. 50 parts of ice are slowly added and then the yellowish diazo solution is poured into the solution of the sodium salt of 42.2 parts of 2-amino-8-hydroxynaphthalene-6-sulphonic acid-N-ethyl-N-3'-sulphophenyl amide and 25 parts of crystallised sodium acetate in 600 parts of water. Coupling occurs immediately and the colour becomes red. The reaction mixture is stirred for 6 hours at 0–10°, the acid is partially neutralised by sprinkling in 30 parts of sodium carbonate, 100 parts of sodium chloride are added and the precipitated dyestuff is filtered off. It is washed neutral on the filter with a 2% aqueous solution of sodium chloride and dried at 80°. In the form of the dry sodium salt it is a brown powder which dissolves in hot water with a blueish red colour.

On boiling in a bath containing 5% ammonium sulphate, the dyestuff dyes wool in level, pure blueish red shades which are very fast to light and wet.

EXAMPLE 6

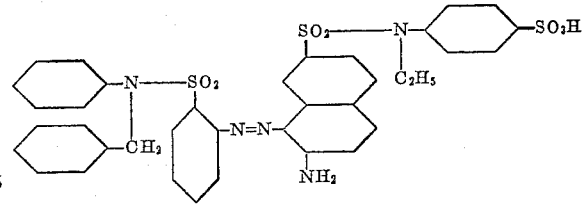

33.8 parts of 2-aminobenzene-1-sulphonic acid-N-benzyl-N-phenyl amide are diazotised under conditions corresponding to those described in Example 5 and coupled at 0–5° with a suspension of 40.6 parts of 2-aminonaphthalene-7-sulphonic acid-N-ethyl-N.4'-sulphophenyl amide and 40 parts of crystallised sodium acetate in 400 parts of ethanol and 300 parts of water. Coupling occurs immediately and the colour becomes orange. The monoazo dyestuff formed precipitates immediately as an orange powder. The mixture is stirred for several hours at 0–10°, the acid is partially neutralised with 80 parts of sodium carbonate and the precipitated dyestuff is filtered off. It is washed neutral on the filter with 2% aqueous sodium chloride solution and dried.

It is a brown powder which dissolves in hot water with an orange colour. On boiling in a bath containing ammonium sulphate it dyes wool in level, pure orange shades which are fast to light and wet.

Further monoazo dyestuffs according to the present invention are given in the following table. They are produced according to the methods described in Examples 1 to 6 on using corresponding amounts of diazo and azo components.

| No. | Parts | Diazo component | Parts | Azo component | Shade of wool dyeing |
|---|---|---|---|---|---|
| 1 | 30.5 | 2-aminobenzene-1-sulphonic acid-4'-tert. butyl-phenyl ester. | 42.2 | 2-amino-8-hydroxynaphthalene-6-sulphonic acid-N-ethyl-N-4'-sulphophenyl amide. | blueish red. |
| 2 | 33.1 | 2-aminobenzene-1-sulphonic acid-4'-cyclo-hexylphenyl ester. | 42.2 | ----do---- | Do. |
| 3 | 24.9 | 2-aminobenzene-1-sulphonic acid phenyl ester. | 45.8 | 2-amino-8-hydroxynaphthalene-6-sulphonic acid-N-methyl-N N-[7-sulphonaphthyl-(2)]-amide. | Do. |
| 4 | 32.5 | 2-aminobenzene-1-sulphonic acid-4'-xenyl ester. | 40.6 | 2-aminonaphthalene-7-sulphonic acid-N-ethyl-N-4'-sulphophenyl amide. | orange. |
| 5 | 29.9 | 2-aminobenzene-1-sulphonic acid-β-naphthyl ester. | 40.6 | ----do---- | Do. |
| 6 | 29.9 | 2-aminobenzene-1-sulphonic acid-α-naphthyl ester. | 40.6 | ----do---- | Do. |
| 7 | 32.5 | 2-aminobenzene-1-sulphonic acid-2'-xenyl ester. | 40.8 | 2-amino-8-hydroxynaphthalene-6-sulphonic acid-N-methyl-N-3'-sulphophenyl amide. | blueish red. |
| 8 | 33.1 | 2-aminobenzene-1-sulphonic acid-2'cyclohexylphenyl ester. | 40.8 | ----do---- | Do. |
| 9 | 31.8 | 2-aminobenzene-1-sulphonic acid-3',4'-dichlorophenyl ester. | 40.8 | ----do---- | Do. |
| 10 | 30.5 | 2-aminobenzene-1-sulphonic acid-β-(ar)-tetrahydronaphthyl ester. | 43.4 | 2-aminonaphthalene-5-sulphonic acid-N-n-butyl-N-4'-sulphophenyl amide. | orange. |
| 11 | 36.6 | 5-benzoylamino-2-amino-4'-methyl-1.1'-diphenyl-sulphone. | 42.2 | 2-amino-8-hydroxynaphthalene-6-sulphonic acid-N-ethyl-N-4'-sulphophenyl amide. | blueish red. |
| 12 | 39.6 | 5-carbobenzyloxyamino-2-amino-4'-methyl-1.1'-diphenyl sulphone. | 42.2 | ----do---- | Do. |
| 13 | 40.85 | 4-carbocyclohexyloxy-amino-2-amino-4'-chloro-1.1'-diphenyl sulphone. | 42.2 | 2-amino-8-hydroxynaphthalene-6-sulphonic acid-N-methyl-N-4'-sulphobenzylamide. | blueish red. |
| 14 | 35.2 | 2-amino-3'-benzoyl-amino-1.1'-diphenyl sulphone. | 39.2 | 2-aminonaphthalene-7-sulphonic acid-N-methyl-N-3'-sulphophenylamide. | red-orange. |
| 15 | 23.3 | 2-amino-1.1'-diphenyl sulphone | 48.4 | 2-amino-8-hydroxynaphthalene-6-sulphonic acid-N-benzyl-N-4'-sulphophenyl amide. | blueish red. |
| 16 | 27.2 | 2-aminobenzene-1-sulphonic acid-N-ethyl-N-phenyl amide. | 45.8 | 2-amino-8-hydroxynaphthalene-6-sulphonic acid-N-methyl-N-4'-sulpho-α-naphthylamide. | Do. |
| 17 | 33.1 | 2-aminobenzene-1-sulphonic acid-N-methyl-N-3',4'-dichlorophenyl amide. | 45.8 | ----do---- | Do. |
| 18 | 33.8 | 2-aminobenzene-1-sulphonic acid-N-benzyl-N-phenyl amide. | 40.8 | 2-amino-8-hydroxynaphthalene-6-sulphonic acid-N-4'-sulphobenzyl amide. | red. |
| 19 | 33.8 | ----do---- | 40.8 | 2-amino-8-hydroxynaphthalene-6-sulphonic acid-N-methyl-N-3'-sulphophenylamide. | Do. |
| 20 | 33.8 | ----do---- | 39.2 | 2-aminonaphthalene-7-sulphonic acid-N-4'-sulphobenzylamide. | orange. |
| 21 | 35.6 | 2-aminobenzene-1-sulphonic acid-N-ethyl-N-4'-sulphophenylamide. | 45.0 | 2-amino-8-hydroxynaphthalene-6-sulphonic acid-N-butyl N 4'-sulphobenzyl amide. | yellowish red. |
| 22 | 29.0 | 2-aminobenzene-1-sulphonic acid-N-ethyl-N-2'-methyl-phenyl amide. | 40.8 | 2-amino-8-hydroxynaphthalene-6-sulphonic acid-N-methyl-N-4'-sulphophenyl amide. | blueish red. |
| 23 | 35.2 | 2-aminobenzene-1-sulphonic acid-N-benzyl-N-2'-methyl phenyl amide. | 40.8 | ----do---- | Do. |
| 24 | 37.8 | 2-aminobenzene-1-sulphonic acid-4'-carbo-amyloxyaminophenyl ester. | 40.8 | ----do---- | Do. |
| 25 | 39.8 | 2-aminobenzene-1-sulphonic acid-3'-carbobenzyloxyaminophenyl ester. | 40.8 | ----do---- | Do. |
| 26 | 39.8 | ----do---- | 40.6 | 2-aminonaphthalene-6-sulphonic acid-N-ethyl-N-4'-sulphophenyl amide. | orange. |
| 27 | 34.05 | 2-aminobenzene-1-sulphonic acid-4'-chloracetylaminophenyl ester. | 42.2 | 2-amino-8-hydroxynaphthalene-6-sulphonic acid-N-ethyl-N-4'-sulphophenylamide. | blueish red. |
| 28 | 36.8 | 2-aminobenzene-1-sulphonic acid-4'-benzoylaminophenyl ester. | 42.2 | ----do---- | Do. |
| 29 | 34.1 | 2-aminobenzene-1-sulphonic acid-4'-phenoxyphenyl ester. | 42.2 | ----do---- | Do. |
| 30 | 33.6 | 2-aminobenzene-1-sulphonic acid-3'-carbethoxyaminophenyl ester. | 44.4 | 2-amino-8-hydroxyhaphthalene-6-sulphonic acid-N-7'-sulpho-β-naphthyl amide. | Do. |
| 31 | 33.8 | 2-aminobenzene-1-sulphonic acid-N-methyl-N-4'-xenyl-amide. | 42.2 | 2-amino-8-hydroxynaphthalene-6-sulphonic acid-N-ethyl-N-4'-sulphophenyl amide. | blueish red. |
| 32 | 32.45 | 2-amino-3'-chloracetyl-amino-1.1'-diphenyl sulphone. | 42.2 | ----do---- | Do. |
| 33 | 35.35 | 2-aminobenzene-1-sulphonic acid-N-methyl-N-4'-chloracetylaminophenyl amide. | 42.2 | ----do---- | Do. |
| 34 | 42.3 | 2-aminobenzene-1-sulphonic acid-N-methyl-N-[2''-(4''-chlorophenoxy)-5'-chlorophenyl]-amide. | 42.2 | ----do---- | Do. |

EXAMPLE 7

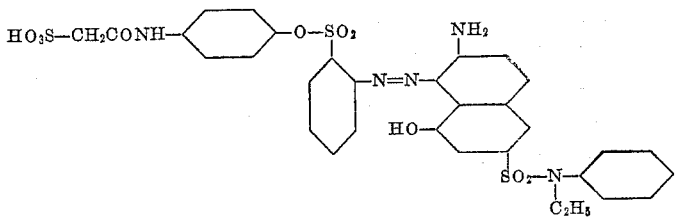

38.6 parts of the sodium salt of 2-aminobenzene-1-sulphonic acid-4'-sulphacetylaminophenyl ester are dissolved in 500 parts of water, 6.9 parts of sodium nitrite are added and the solution is added dropwise to 30 parts of concentrated hydrochloric acid and 100 parts of ice while stirring and externally cooling. After stirring for 1 hour at 0–3°, the excess nitrous acid is decomposed and the diazonium salt solution is poured into the solution of 34.2 parts of 2-amino-8-hydroxynaphthalene-6-sulphonic acid-N-ethyl-N-phenylamide in 300 parts of glacial acetic acid and 500 parts of ethanol. Coupling occurs immediately and a red dyestuff is formed. The mixture is stirred for 8 hours at 10–20°, diluted with 1000 parts of water, heated to 50°, 150 parts of sodium chloride are added and the precipitated red dyestuff is filtered off under suction. The dyestuff is washed with a 2% aqueous solution of sodium chloride until the washing water is neutral and then dried in the vacuum at 80–85°.

The dyestuff is a brown-red powder which dissolves in hot water with a red colour. It dyes wool from a neutral bath or a weakly acid bath containing ammonium sulphate, on boiling, in level, clear, blueish red shades. The dyeings are very fast to light, alkali and milling.

EXAMPLE 8

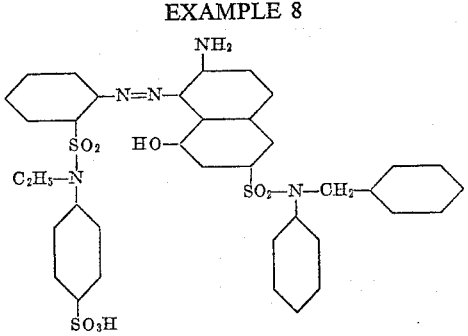

35.6 parts of the sodium salt of 2-aminobenzene-1-sulphonic acid-N-ethyl-N-(4'-sulphophenyl)-amide are dissolved in 500 parts of hot water. 6.9 parts of sodium nitrite are added to the solution and the solution is added dropwise to the mixture of 30 parts of concentrated hydrochloric acid and 100 parts of ice at 0–5° while stirring and externally cooling. The colourless diazo suspension is stirred for another hour at 0–5° and the excess nitrous acid is decomposed. The diazonium salt suspension is then slowly poured at 0–10° while stirring into the solution of 40.4 parts of 2-amino-8-hydroxynaphthalene-6-sulphonic acid-N-benzyl-N-phenylamide in 250 parts of glacial acetic acid and 500 parts of ethanol. The coupling occurs quickly and a red dyestuff is formed. After stirring the mixture for 8 hours at 5–10°, it is warmed to 60°, 2000 parts of hot water are added and the acid is neutralised to some extent by sprinkling in 80 parts of sodium carbonate. The dyestuff is precipitated in the form of the sodium salt with sodium chloride, filtered off under suction, washed well with 2% sodium chloride solution and dried.

The red dyestuff dissolves in hot water and dyes wool from a neutral to weakly acid bath in pure blueish red shades. The wool dyeings are very fast to light, alkali and wet.

EXAMPLE 9

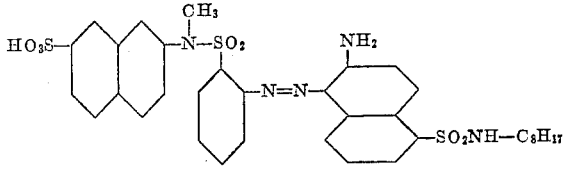

39.2 parts of the sodium salt of 2-aminobenzene-1-sulphonic acid-N-methyl-N-[7'-sulphonaphthyl-(2')]-amide are dissolved in 1000 parts of water, 6.9 parts of sodium nitrite are added and the 40° warm solution is added dropwise at 0–8° to 30 parts of concentrated hydrochloric acid and 100 parts of ice. After stirring for 1 hour at 0–5° and decomposing the excess nitrous acid, the colourless diazonium salt suspension is poured into the solution of 33.4 parts of 2-aminonaphthalene-5-sulphonic acid octyl amide in 500 parts of ethanol. After adding 25 parts of crystallised sodium acetate, the dyestuff suspension is stirred for 6 hours at 10–15°, diluted with 1000 parts of hot water, 200 parts of sodium chloride are added and the precipitated orange dyestuff is filtered off under suction. It is washed on the filter with a 2% aqueous solution of sodium chloride until the washing water is neutral and then dried in the vacuum at 80–85°.

The dyestuff dissolves in hot water with an orange colour and on boiling in a bath containing ammonium sulphate, dyes wool in level, clear, orange shades. The dyeings are distinguished by remarkable fastness to wet and light.

EXAMPLE 10

40.5 parts of the sodium salt of 2-aminobenzene-1-sulphonic acid-4''-sulphodiphenyl-(4')-ester are dissolved in 1000 parts of hot water, 6.9 parts of sodium nitrite are added and the solution is added dropwise while stirring and externally cooling at 0–10° to the mixture of 30 parts of concentrated hydrochloric acid and 100 parts of ice. The mixture is stirred for 1 hour at 0–5° and then the excess nitrous acid is decomposed. The colourless diazonium salt suspension is then slowly poured at 5–10° while stirring into 32.6 parts of 2-aminonaphthalene-7-sulphonic acid-N-ethyl-N-phenylamide dissolved in 500 parts of ethanol and 200 parts of glacial acetic acid. The coupling occurs quickly and an orange dyestuff is formed which immediately precipitates. The dyestuff suspension is stirred for several hours at 10–20°, the acid is neutralised to some extent with 80 parts of sodium carbonate, and the precipitated dyestuff is filtered off under suction and dried.

The dyestuff is an orange powder which dissolves in hot water with a yellow-orange colour. On boiling in a neutral or in a weakly acid bath containing ammonium sulphate, it dyes wool in clear, level, orange shades. The wool dyeings are fast to wet and light.

EXAMPLE 11

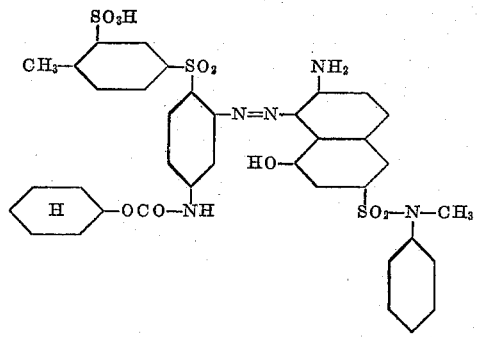

46.8 parts of the sodium salt of 2-amino-4-carbocyclohexyloxyamino - 4' - methyl - 1.1' - diphenyl sulphone - 3'-sulphonic acid are dissolved in 1000 parts of water at 80°, 6.9 parts of sodium nitrite are added and the warm solution is added dropwise to 30 parts of concentrated hydrochloric acid and 200 parts of ice at 0–10° while stirring and externally cooling. After stirring for 1 hour at 0–5°, the excess nitrous acid is decomposed and the aqueous suspension of the diazonium salt is coupled with a solution of 32.8 parts of 2-amino-8-hydroxynaphthalene-6-sulphonic acid-N-methyl-N-phenyl amide and 25 parts of crystallised sodium acetate in 500 parts of ethanol and 100 parts of water. A red dyestuff is immediately formed. After stirring the mixture for 6 hours at 10–20°, it is warmed to 60° and 1000 parts of hot water are added. The dyestuff is precipitated with 100 parts of sodium chloride, filtered off, well washed with a 2% solution of aqueous sodium chloride and dried in the vacuum at 80–85°.

The dyestuff is a brown powder which dissolves in hot water with a red colour. On boiling in a bath containing ammonium sulphate, it dyes wool in level, pure, blueish-red shades. The dyeings are very fast to light, washing and milling.

Other dyestuffs according to the present invention are given in the following table. They can be produced by the methods described in Examples 7–11 on using corresponding amounts of diazo and azo components.

Table

| No. | Diazo component | Azo component | Shade of wool dyeing |
| --- | --- | --- | --- |
| 1 | 2 aminobenzene-1-sulphonic acid-4''-sulphodiphenyl-(4')-ester. | 2-amino-8-hydroxynaphthalene-6-sulphonic acid di-n-butyl-amide. | blueish red. |
| 2 | ----do---- | 2-amino-8-hydroxynaphthalene-6-sulphonic acid morpholide. | red. |
| 3 | 2-aminobenzene-1-sulphonic acid-3'-sulphoacetylaminophenyl ester. | 2-amino-8-hydroxynaphthalene-6-sulphonic acid-N-methyl-N-phenylamide. | blueish red. |
| 4 | 2-amino-4-chlorobenzene-1-sulphonic acid-4'-sulphoacetylaminophenyl ester. | ----do---- | Do. |
| 5 | 2-aminobenzene-1-sulphonic acid-2'-chloro-4'-sulphoacetylaminophenyl ester. | ----do---- | Do. |
| 6 | ----do---- | 2-aminonaphthalene-6-sulphonic acid-N-methyl-N-phenylamide. | orange. |
| 7 | 2-aminobenzene-1-sulphonic acid-4'-(4''-sulphophenoxy)-phenyl ester. | ----do---- | Do. |
| 8 | 2-aminobenzene-1-sulphonic acid-4'-(4''-sulphophenoxy)-phenyl ester. | 2-aminonaphthalene-7-sulphonic acid-N-n-butylamide. | orange. |
| 9 | ----do---- | 2-amino-8-hydroxynaphthalene-6-sulphonic acid-N-ethyl-N-phenylamide. | blueish red. |
| 10 | 2-aminobenzene-1-sulphonic acid-4'-sulphophenyl ester. | 2-amino-8-hydroxynaphthalene-6-sulphonic acid-N-benzyl-N-phenylamide. | Do. |
| 11 | 2-aminobenzene-1-sulphonic acid-N-ethyl-N-(4'-sulphophenyl)-amide. | 2-amino-8-hydroxynaphthalene-6-sulphonic acid-N-methyl-N-p-(p'-tolylsulphonyl)-phenyl amide. | Do. |
| 12 | ----do---- | 2-aminonaphthalene-7-sulphonic acid-N-di-n-butyl amide. | orange. |
| 13 | 2-aminobenzene-1-sulphonic acid-4'-sulphoacetylamino-phenyl ester. | 2-aminonaphthalene-5-sulphonic acid dicyclohexyl amide. | Do. |
| 14 | 2-aminobenzene-1-sulphonic acid-N-methyl-N-[4''-sulphodiphenyl-(4')]-amide. | 2-aminonaphthalene-5-sulphonic acid morpholide. | Do. |
| 15 | 2-aminobenzene-1-sulphonic acid-N-ethyl-N-(4'-sulphophenyl)-amide. | 2-amino-8-hydroxynaphthalene-6-sulphonic acid-N-octyl amide. | blueish red. |
| 16 | 2-aminobenzene-1-sulphonic acid-N-cyclohexyl-N-(4'-sulphophenyl)-amide. | 2-amino-8-hydroxynaphthalene-6-sulphonic acid-N-methyl-N-phenylamide. | Do. |
| 17 | 2-aminobenzene-1-sulphonic acid-N-benzyl-N-(4'-sulphophenyl)-amide. | 2-amino-8-hydroxynaphthalene-6-sulphonic acid ethylamide. | Do. |
| 18 | ----do---- | 2-aminonaphthalene-7-sulphonic acid dimethylamide. | orange. |
| 19 | 2-aminobenzene-1-sulphonic acid-N-methyl-N-(4'-sulphoacetylaminophenyl)-amide. | 2-amino-8-hydroxynaphthalene-6-sulphonic acid-N-ethyl-N-(2'-methylphenyl)-amide. | blueish red. |
| 20 | ----do---- | 2-amino-8-hydroxynaphthalene-6-sulphonic acid N-methyl-N-phenylamide. | Do. |
| 21 | 2-aminobenzene-1-sulphonic acid-N-ethyl-N-(4'-sulphophenyl)-amide. | 2-amino-8-hydroxynaphthalene-6-sulphonic acid dicyclohexyl-amide. | Do. |
| 22 | 2-aminobenzene-1-sulphonic acid-N-methyl-N-[4'-(4''-sulphophenoxy)-phenyl]-amide. | 2-amino-8-hydroxynaphthalene-6-sulphonic acid-N-methyl-N-phenylamide. | Do. |
| 23 | 2-aminobenzene-1-sulphonic acid-N-methyl-N-[2'-(4''-chloro-2''-sulphophenoxy)-4'-chlorophenyl]-amide. | 2-amino-8-hydroxynaphthalene-6-sulphonic acid-N-methyl-N-phenylamide. | Do. |
| 24 | 2-aminobenzene-1-sulphonic acid-N-methyl-N-[3'-sulphoacetylaminophenyl]. | 2-aminonaphthalene-7-sulphonic acid-n-butylamide. | orange |
| 25 | 2-aminobenzene-1-sulphonic acid-N-methyl-N-(2'-chloro-4'-sulphoacetylaminophenyl)-amide. | 2-aminonaphthalene-7-sulphonic acid-N-methyl-N-(2',5'-dimethylphenyl)-amide. | Do. |
| 26 | ----do---- | 2-aminonaphthalene-7-sulphonic acid morpholide. | Do. |
| 27 | 2-aminobenzene-1-sulphonic acid-N-methyl-N-(2,4'-sulphonaphthyl)-amide. | ----do---- | Do. |
| 28 | 2-aminobenzene-1-sulphonic acid-N-methyl-N-(2,6'-sulphonaphthyl)-amide. | 2-aminonaphthalene-6-sulphonic acid-N-methyl-N-phenylamide. | Do. |
| 29 | 2-amino-4-(4''-tert. amyl-benzoylamino)-4'-methyl-1.1'-diphenyl sulphone-3'-sulphonic acid. | 2-aminonaphthalene-5-sulphonic acid-n-butylamide. | Do. |
| 30 | 2-amino-4-carbocyclohexyloxyamino-4'-methyl-1.1'-diphenyl sulphone-3'-sulphonic acid. | 2-amino-8-hydroxynaphthalene-6-sulphonic acid-N-methyl-N-phenylamide. | blueish red. |
| 31 | 2-amino-5-carboamyloxyamino-4'-methyl-1.1'-diphenyl sulphone-3'-sulphonic acid. | ----do---- | Do. |
| 32 | 2-amino-5-(carbo-4''-chloro-benzyloxyamino)-4'-methyl-1.1'-diphenyl sulphone-3'-sulphonic acid. | ----do---- | Do. |

Table—Continued

| No. | Diazo component | Azo component | Shade of wool dyeing |
|---|---|---|---|
| 33 | 2-amino-1.1'-diphenyl sulphone-3'-sulphonic acid. | 2-amino-8-hydroxy-naphthalene-6-sulphonic acid-N-benzyl-N-phenylamide. | blueish red. |
| 34 | ——do—— | 2-aminonaphthalene-7-sulphonic acid-N-octylamide. | orange. |
| 35 | 2-amino-3'-sulphoacetyl-amino-1.1'-diphenyl sulphone. | 2-aminonaphthalene-7-sulphonic acid-N-methyl-N-phenylamide. | Do. |
| 36 | ——do—— | 2-amino-8-hydroxy-naphthalene-6-sulphonic acid-N-octylamide. | blueish red. |
| 37 | ——do—— | 2-amino-8-hydroxy-naphthalene-6-sulphonic acid-di-n-butylamide. | Do. |

EXAMPLE 12

100 parts of previously well wetted wool are entered at 40° into a dyebath which contains 2 parts of the monoazo dyestuff obtained according to Example 2 and 5 parts of Glauber's salt in 300 parts of water. The bath is brought to the boil within 45 minutes and kept at the boil for 1½ hours while moving the goods well. A very level, pure blueish-red wool dyeing is obtained which is distinguished by very good fastness properties.

Equally good wool dyeings are obtained when an acid dyebath is used, for example when dyeing is performed in the presence of 1 part of 40% acetic acid.

The dyestuffs according to the other examples can dye wool in a similar manner.

The present application is a continuation-in-part of applications Ser. No. 782,394, filed December 23, 1958, and Ser. No. 793,244, filed February 16, 1959, both now abandoned.

What we claim is:
1. The monoazo dyestuff of the formula

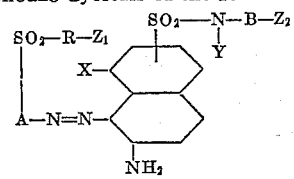

wherein
A represents a mononuclear carbocyclic aryl radical containing the sulphonyl group in o-position to the azo group and which is free from carboxylic acid and sulphonic acid groups,
B represents a member selected from the group consisting of phenyl, benzyl and naphthyl radicals free from carboxylic acid groups, and if $Z_2$ is hydrogen also alkyl and cyclohexyl radicals,
R represents a member selected from the group consisting of mononuclear carbocyclic aryl, at most binuclear carbocyclic aryloxy and secondary amino radicals, free from carboxylic acid groups,
X represents a member selected from the group consisting of H and OH, and
Y represents a member selected from the group consisting of hydrogen, lower alkyl and benzyl radicals, and if $Z_2$ is hydrogen also cyclohexyl radicals,
and of $Z_1$ and $Z_2$, one Z represents the sulphonic acid group and the other Z represents hydrogen.

2. The monoazo dyestuff of the formula

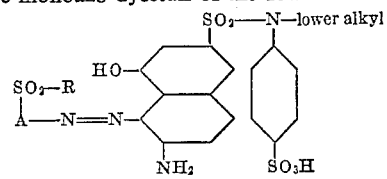

wherein
A represents a mononuclear carbocyclic aryl radical containing the sulphonyl group in o-position to the azo group and which is free from carboxylic acid and sulphonic acid groups, and
R represents an at most binuclear carbocyclic aryloxy radical which is free from carboxylic acid and sulphonic acid groups.

3. The monoazo dyestuff of the formula

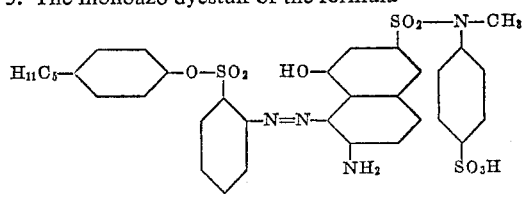

4. The monoazo dyestuff of the formula

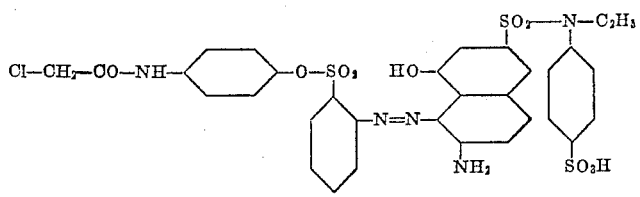

5. The monoazo dyestuff of the formula

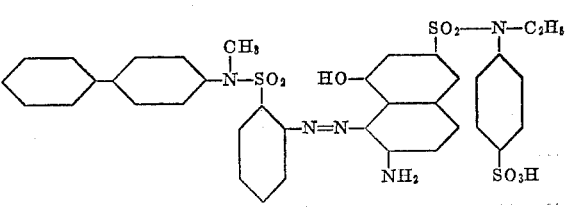

6. The monoazo dyestuff of the formula

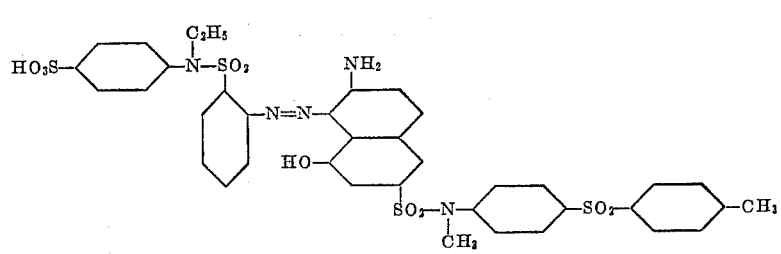

7. The monoazo dyestuff of the formula
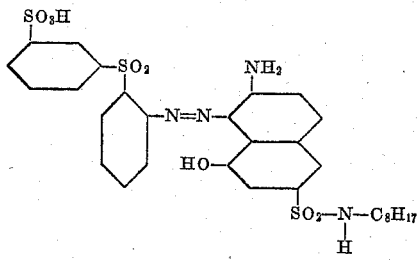
References Cited in the file of this patent
UNITED STATES PATENTS
| | | | |
|---|---|---|---|
| | 1,903,599 | Schweitzer | Apr. 11, 1933 |
| 5 | 2,358,519 | Krebser et al. | Sept. 19, 1944 |
| | 2,849,437 | Montmollin et al. | Aug. 26, 1958 |